Figure 19:
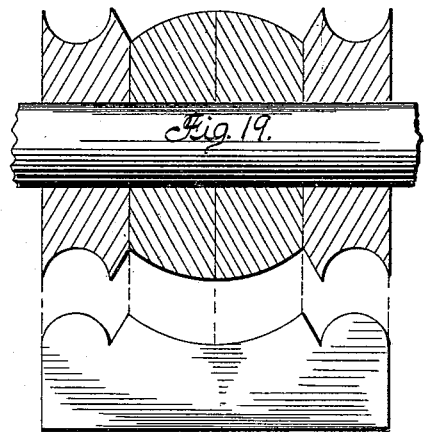

(No Model.) 3 Sheets—Sheet 1.
J. BARNES.
REVERSIBLE ROTARY CUTTER.
No. 449,571. Patented Mar. 31, 1891.
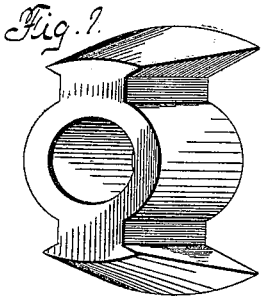
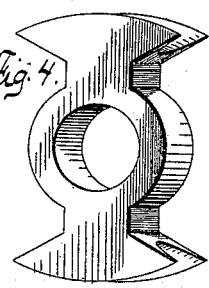
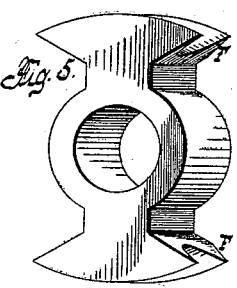
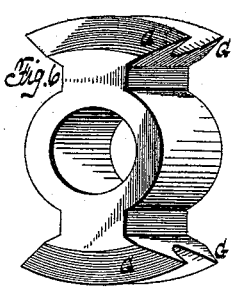
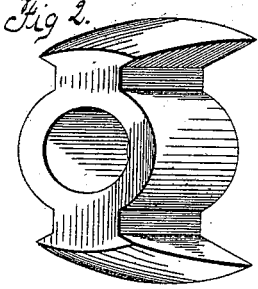
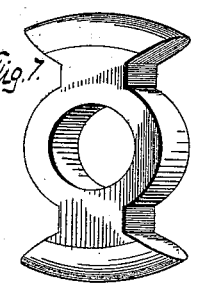
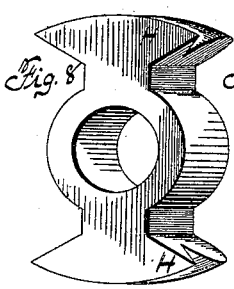
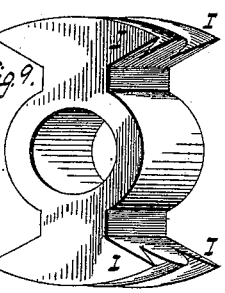
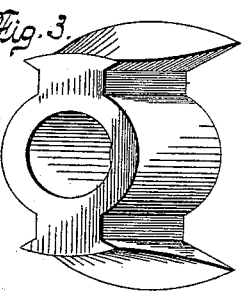
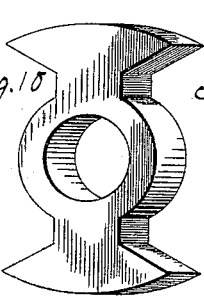
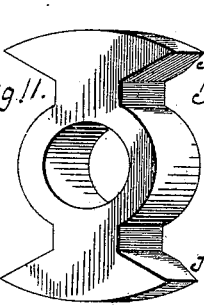
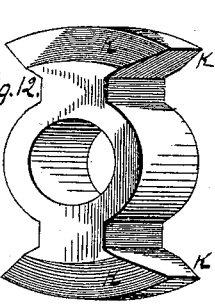
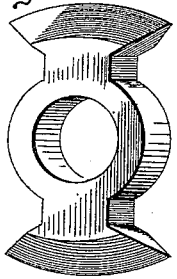
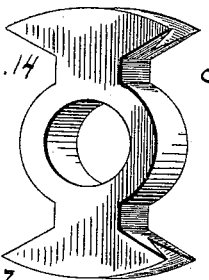
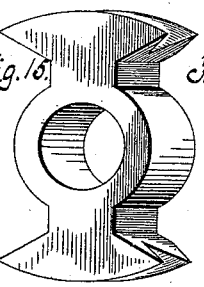
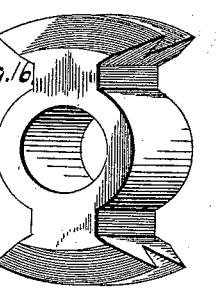
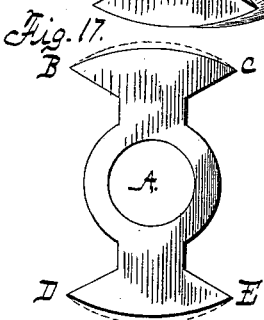
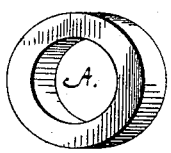
Witnesses:
E. Behel.
Evans Blake
Inventor:
John Barnes.
By A.O. Behel
Atty.

(No Model.)   3 Sheets—Sheet 2.

J. BARNES.
REVERSIBLE ROTARY CUTTER.

No. 449,571.   Patented Mar. 31, 1891.

Witnesses:
E. Behel.
Evans Blake

Inventor:
John Barnes.
By A. O. Behel
Atty.

(No Model.) 3 Sheets—Sheet 3.
J. BARNES.
REVERSIBLE ROTARY CUTTER.

No. 449,571. Patented Mar. 31, 1891.

Witnesses:
E. Behel.
Evans Blake

Inventor:
John Barnes
By A.O. Behel
Atty.

UNITED STATES PATENT OFFICE.

JOHN BARNES, OF ROCKFORD, ILLINOIS, ASSIGNOR TO THE W. F. & JOHN BARNES COMPANY, OF SAME PLACE.

REVERSIBLE ROTARY CUTTER.

SPECIFICATION forming part of Letters Patent No. 449,571, dated March 31, 1891.

Application filed February 28, 1889. Serial No. 301,468. (No model.)

*To all whom it may concern:*

Be it known that I, JOHN BARNES, a citizen of the United States, residing at Rockford, in the county of Winnebago and State of Illinois, have invented certain new and useful Improvements in Reversible Rotary Cutters, of which the following is a specification.

The object of this invention is to construct a reversible rotary cutter consisting of a series of cutting-disks, one of the disks having a diameter on one face at the cutting-edge different from the diameter on the other face at the cutting-edge, and the diameter on each face of the other disks at the cutting-edge corresponding to one of the above-mentioned diameters, so that said disks can be arranged relative to one another to produce a great variety of moldings.

In the accompanying drawings I have represented various forms of cutter-disks, and also various combinations of the cutter-disks, beneath which are illustrated the forms of moldings produced by the various combinations.

Figures 1 to 16 show different forms of cutter-disks. Fig. 17 is a face view of a cutter-disk, showing the clearance in dotted lines. Fig. 18 is an isometrical representation of a washer placed between the cutter-disks, so that a surface the width of the washer will remain uncut, thereby forming a tongue. Figs. 19 to 30, inclusive, are representations of various forms of moldings; also, the combination of cutter-disks used in forming such moldings.

The cutter-disks represented in the drawings are preferably stamped out of solid material, having a central opening A of a size to admit the spindle of a former or other suitable machine. The periphery of each of the individual cutter-disks composing the complete cutter is eccentric, having its cutting-edges farthest from the center, thereby giving the necessary clearance, as shown by the dotted lines at Fig. 17. These cutter-disks are provided with four cutting-edges B, C, D, and E. The cutter-disks are made reversibly rotatable and can be used in connection with a former or other similar machine having but a single spindle capable of being rotated in opposite directions. The cutting-edges B and C are on one wing of the cutter-disk and the cutting-edges D and E on the other wing.

Figs. 1, 2, and 3 show cutter-disks having the diameter of one face at the cutting-edges smaller than the corresponding diameter of the other face. Those shown in Figs. 5, 8, 11, and 15 are cutters with faces of different diameters, like those shown in Figs. 1, 2, and 3, but differing from them in the shape of the cutting-edge. The cutter-disks shown in Figs. 4, 9, 10, and 14 have both faces equal in diameter to one another and to the larger face of the cutters having unequal faces, and those of Figs. 6, 7, 12, 13, and 16 show cutter-disks having both faces equal in diameter to one another and to the smaller face of the cutters of unequal faces.

The cutter-disks represented at Figs. 1, 2, and 3 have their faces of different diameters, and a cut will be made corresponding to the shape of the cutter-disk used. Thus the cutter-disk represented at Fig. 1 will produce a straight inclined cut.

The cutter-disk represented at Fig. 2 is of convex form and will produce a cut concave in form, and the cutter-disk represented at Fig. 3 is of concave form and will produce a convex cut.

The cutter-disks represented by Figs. 4, 5, and 6 are for forming beads. Fig. 5 has one face beveled, as at F, and Fig. 6 has both faces beveled, as at G.

The cutter-disks represented by Figs. 7, 8, and 9 are for forming flutes. Fig. 8 has wings H formed on one face, and Fig. 9 has wings I formed on both faces.

The cutter-disks represented by Figs. 10, 11, and 12 are for forming grooves. Fig. 11 has one face beveled, as at J, and Fig. 12 has both faces beveled, as at K.

The cutter-disk represented at Fig. 13 is for forming valleys. Figs. 14, 15, and 16 are for forming ridges, Fig. 14 forming a single ridge, and Fig. 16 for forming double ridges. A washer, Fig. 18, of any suitable diameter is placed between other cutters when it is desired to leave a surface uncut.

The molding represented by Fig. 19 may be cut by the cutter-disks there represented, consisting of two represented by Fig. 5 and two represented by Fig. 2.

Figure 20:
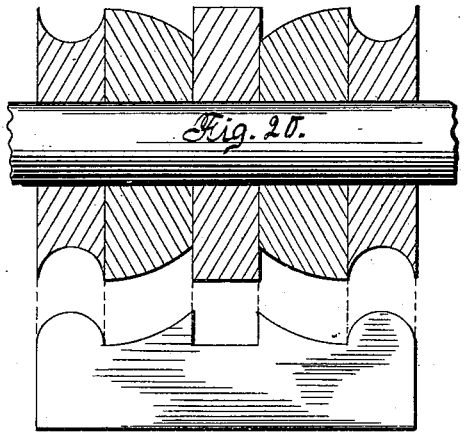

The cutter-disks for forming the molding represented by Fig. 20 consist of two represented by Fig. 4, two represented by Fig. 2, and a single cutter-disk represented by Fig. 10.

Figure 21:
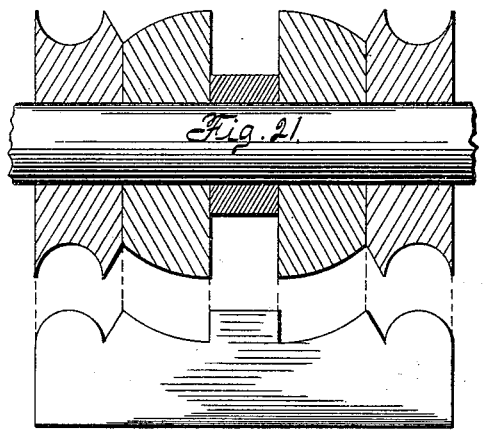

The cutter-disks necessary for forming the molding represented by Fig. 21 consist of two represented by Fig. 5, two represented by Fig. 2, and the washer represented by Fig. 18.

Figure 22:
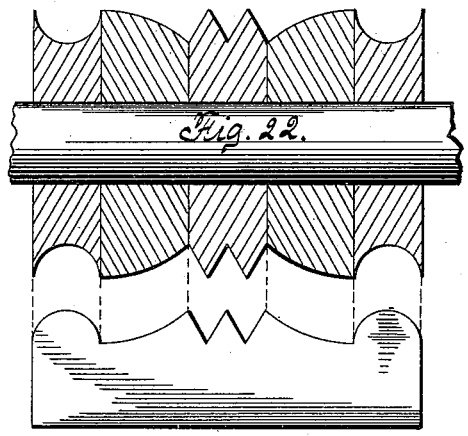

Two cutter-disks like that represented by Fig. 4, two like Fig. 2, and one like Fig. 16 are required for forming the molding represented by Fig. 22.

Figure 23:
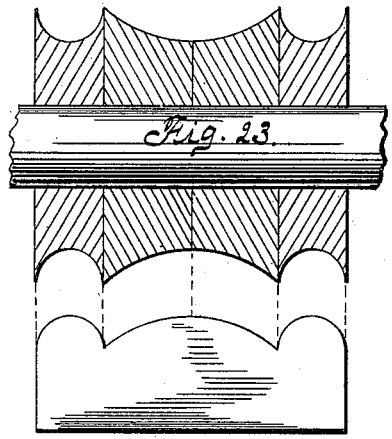

For forming the molding represented at Fig. 23 two cutter-disks like that represented at Fig. 4 and two like that represented at Fig. 3 will be required.

Figure 24:
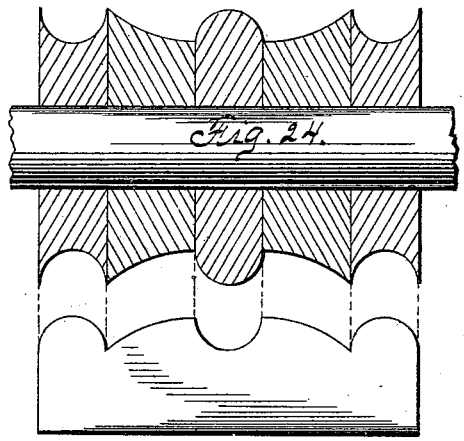

A molding like that represented at Fig. 24 is formed by the combination of cutter-disks consisting of two like that represented by Fig. 4, two like that represented by Fig. 3, and one like Fig. 7.

Figure 25:
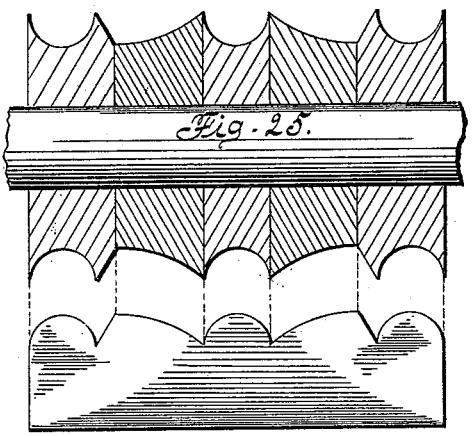

The molding represented by Fig. 25 may be cut by the cutter-disks there represented, consisting of two represented by Fig. 5, two represented by Fig. 3, and one by Fig. 4.

Figure 26:
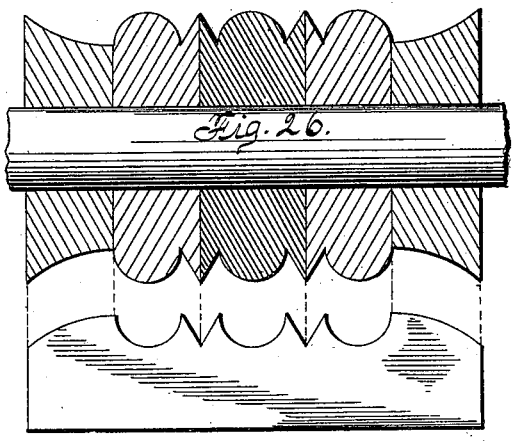

The cutter-disks for forming the molding represented at Fig. 26 consist of two represented by Fig. 3, two represented by Fig. 8, and a single cutter-disk represented at Fig. 9.

Figure 27:
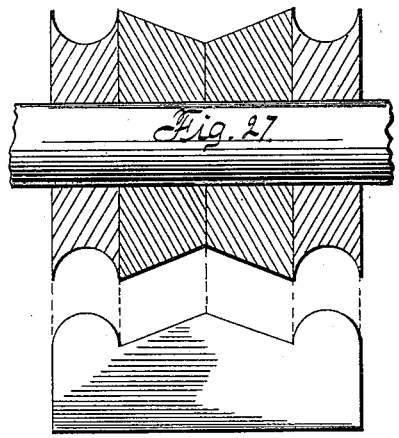

The cutter-disks necessary for forming the molding represented at Fig. 27 consist of two represented by Fig. 4 and two represented by Fig. 1.

Figure 28:
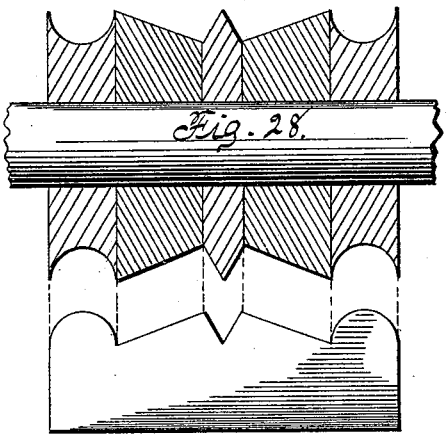

Two cutter-disks like that represented by Fig. 4, two like Fig. 1, and one like Fig. 13 are required for forming the molding represented at Fig. 28.

Figure 29:
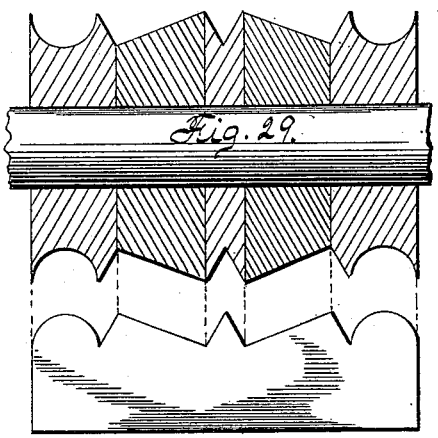

For forming the molding represented at Fig. 29 two cutter-disks like that represented at Fig. 5, two like that represented at Fig. 1, and one like that represented at Fig. 14 will be required.

Figure 30:
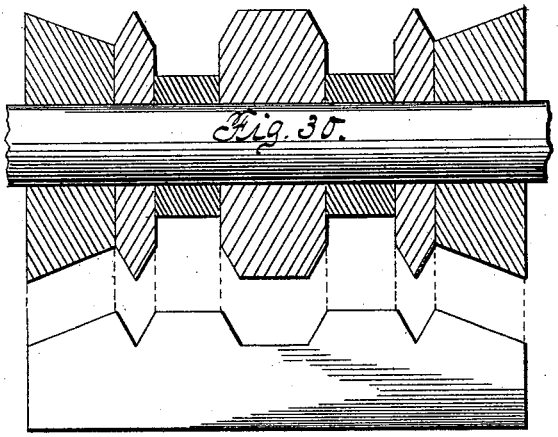

A molding like that represented at Fig. 30 is formed by the combination of cutter-disks consisting of two like that represented at Fig. 1, two like that represented at Fig. 13, one like that represented at Fig. 12, and two washers like that represented at Fig. 18.

The dotted lines connecting the various moldings with their cutter-disks illustrate the portion of the molding cut by each cutter.

It will be seen by the above-described moldings that a great variety of molding may be formed by the various combinations of the cutter-disks, and should the spindle not hold the necessary number of cutter-disks for a complete molding, or whenever a small supply of cutter-disks is kept on hand, one-half or any portion of the molding may be cut at a single operation. I deem it very necessary that the cutter-disk be made reversible—that is, constructed with two or more cutting-edges—to adapt it to cut when revolved in either direction.

It will be seen that with the three kinds of cutter-disks—to wit, the cutters of unequal faces and the smaller and larger cutters of equal faces—it is possible to vary the outline of the cutting-edge and yet have it continuous. Thus a small number of cutter-disks can be made to yield a large variety of designs.

I claim as my invention—

A reversible rotary cutter consisting of a series of cutting-disks, one of the disks having a diameter on one face at the cutting-edge different from the diameter on the other face at the cutting-edge and the diameter on each face of the other disks at the cutting-edge corresponding to one of the above-mentioned diameters.

JOHN BARNES.

Witnesses:
A. O. BEHEL,
E. BEHEL.